(12) United States Patent
Wada (10) Patent No.: US 8,520,133 B2
(45) Date of Patent: Aug. 27, 2013

(54) IMAGING APPARATUS AND METHOD (75) Inventor: Naofumi Wada, Yokohama (JP)

(73) Assignee: Samsung Electronics Co., Ltd (KR)

( * ) Notice: Subject to any disclaimer, the term of this patent is extended or adjusted under 35 U.S.C. 154(b) by 64 days.

(21) Appl. No.: 13/331,477

(22) Filed: Dec. 20, 2011

(65) Prior Publication Data

US 2012/0154669 A1      Jun. 21, 2012

(30) Foreign Application Priority Data

Dec. 21, 2010 (JP) ................................ 2010-284947

(51) Int. Cl.
| H04N 5/232 | (2006.01) |
| H04N 5/217 | (2011.01) |
| H04N 5/00 | (2011.01) |
| G06K 9/40 | (2006.01) |
| G03B 3/00 | (2006.01) |
| G11B 7/00 | (2006.01) |

(52) U.S. Cl.
USPC ........... 348/349; 348/345; 348/354; 348/241; 348/623; 348/607; 382/260; 382/263; 382/255; 382/172; 396/79; 396/89; 396/93; 396/104; 369/44.29; 369/44.34

(58) Field of Classification Search
USPC .............. 348/349, 345, 354, 355, 211.9, 241; 348/243, 511, 607, 623, 625, 627; 382/208, 382/260, 263, 254, 255, 172; 396/79–82, 396/89, 93, 102, 104, 124; 369/44.29, 44.34, 369/44.35

See application file for complete search history.

(56) References Cited

U.S. PATENT DOCUMENTS

| 2005/0128358 A1* | 6/2005 | Nakajima et al. ............. 348/678 |
| 2005/0253955 A1 | 11/2005 | Sato |
| 2010/0303375 A1* | 12/2010 | Suzuki et al. ................. 382/261 |

FOREIGN PATENT DOCUMENTS

| JP | 9107495 | 4/1997 |
| JP | 2005326621 | 11/2005 |
| JP | 2007094236 | 4/2007 |

* cited by examiner

Primary Examiner — Nhan T Tran
Assistant Examiner — Marly Camargo
(74) Attorney, Agent, or Firm — The Farrell Law Firm, P.C.

(57) ABSTRACT

An imaging apparatus that adjusts focus based on frequency components extracted from an image signal is provided. The apparatus includes a 1st order Infinite Impulse Response (IIR)-filter including a plurality of sample delayers having a plurality of line buffers for buffering and delaying a plurality of samples to sequentially read pixels of the image signal through raster scanning and extracting frequency components of the image signal from the read pixels by using the plurality of sample delayers; and a delay sample number controller for controlling the IIR-filter to match the number of horizontal pixels sequentially read from the image signal through raster scanning to the number of the plurality of samples buffered by the plurality of line buffers.

4 Claims, 8 Drawing Sheets

FIG.8C (PRIOR ART)
IMAGE AFTER APPLICATION OF VERTICAL-DIRECTION HIGH-PASS FILTER

FIG.8B (PRIOR ART)
IMAGE AFTER APPLICATION OF HORIZONTAL-DIRECTION HIGH-PASS FILTER

FIG.8A (PRIOR ART)
INPUT IMAGE

IMAGING APPARATUS AND METHOD

PRIORITY

This application claims priority under 35 U.S.C. §119(a) to a patent application filed in the Japan Patent Office on Dec. 21, 2010 and assigned Serial No. JP 284947/2010, and a patent application filed in the Korean Intellectual Property Office on Nov. 18, 2011 and assigned Serial No. 10-2011-0121076, the entire disclosures of which are incorporated herein by reference.

BACKGROUND OF THE INVENTION

1. Field of the Invention

The present invention relates generally to an imaging apparatus and an imaging method.

2. Description of the Related Art

Conventionally, a digital still camera, a camera-mounted cellular phone, a digital video camera, and so forth provide an Auto Focus (AF) function for automatically adjusting focus. The AF can be divided roughly into two schemes: a phase difference detection scheme for optically measuring a distance to an object by using a range-finding sensor and a contrast detection scheme for detecting a position at which a contrast of an image has a peak value as a focusing position. The contrast detection scheme will be described below.

Figure 6:
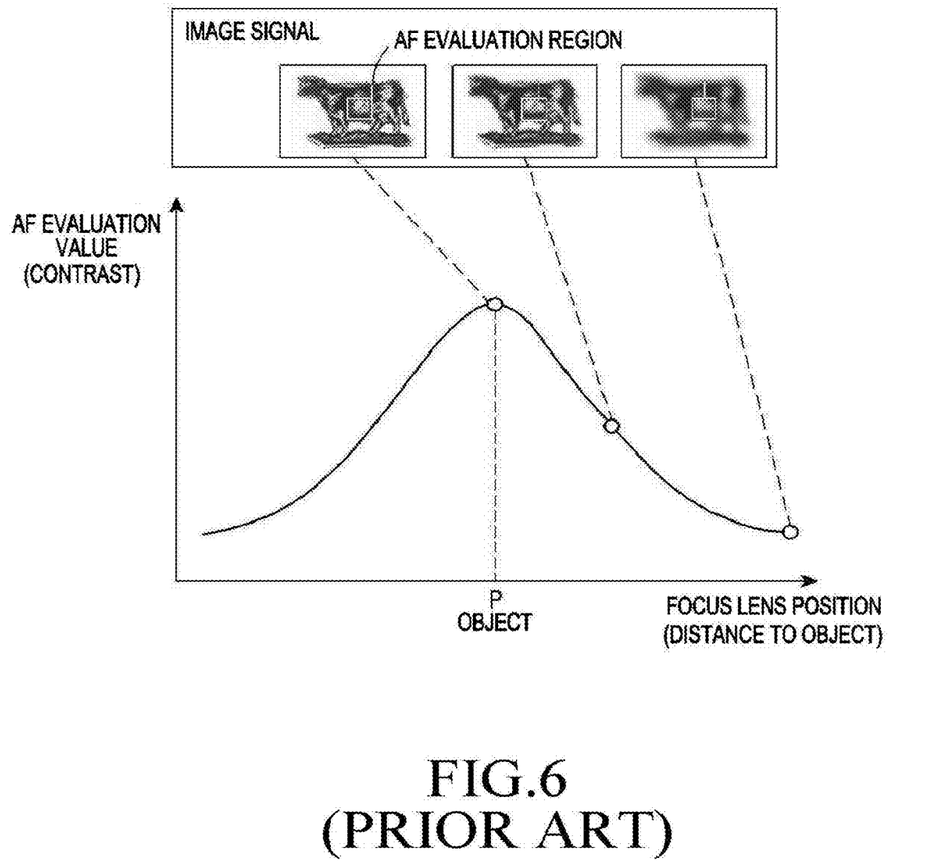
FIG. 6 is a diagram illustrating a contrast detection scheme.

The contrast detection scheme extracts a high-frequency component of an input image signal and controls a focus lens so as to maximize a contrast value (which will hereinafter be referred to as the AF evaluation value) calculated based on the high-frequency component, thereby adjusting focus. FIG. 6 is a diagram illustrating the contrast detection scheme.

Figure 7A:
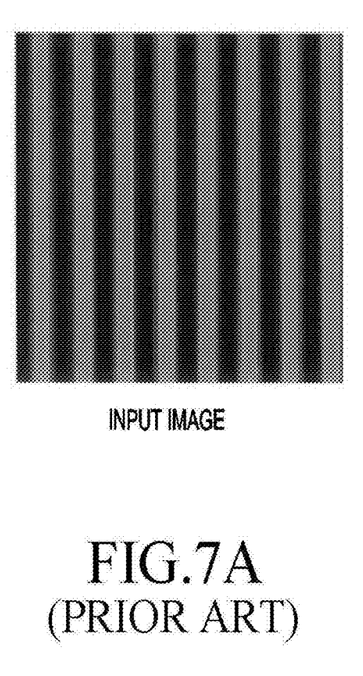
FIG. 7A is a diagram illustrating an image including vertical stripes.
Figure 7B:
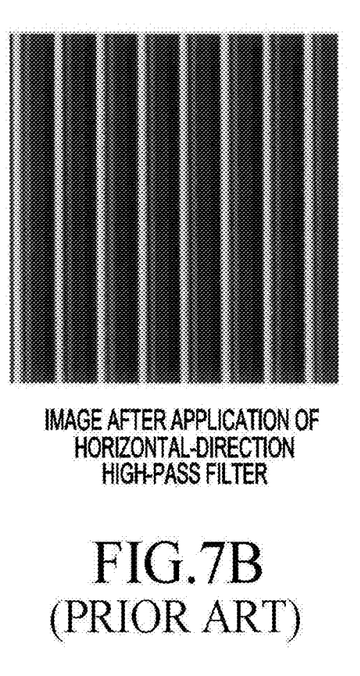
FIG. 7B is a diagram illustrating an image obtained when a horizontal-direction HPF is applied to the image of the vertical stripes shown in FIG. 7A.
Figure 7C:
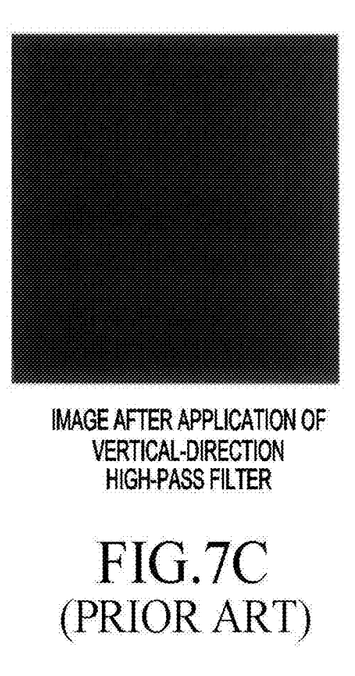
FIG. 7C is a diagram illustrating an image obtained when a vertical-direction HPF is applied to the image of the vertical stripes shown in FIG. 7A.
Figure 8A:
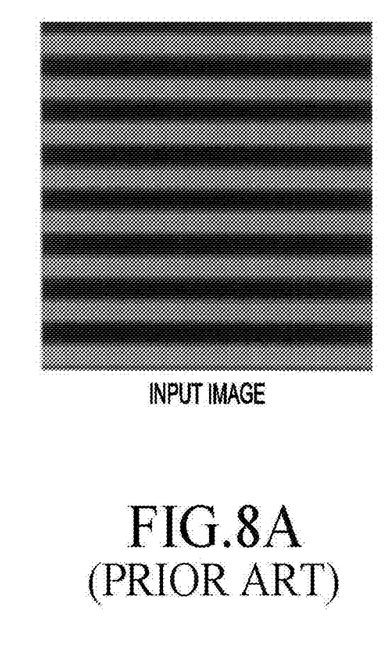
FIG. 8A is a diagram illustrating an image including horizontal stripes.
Figure 8B:
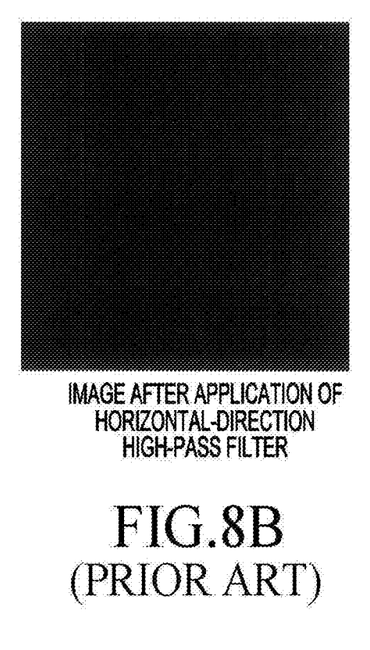
FIG. 8B is a diagram illustrating an image obtained when a horizontal-direction HPF is applied to the image of the horizontal stripes shown in FIG. 8A.

While a High-Pass Filter (HPF) is used to extract the high-frequency component of the image herein, an HPF in a horizontal direction with respect to an image is generally used. For example, by applying a horizontal HPF to an image of vertical stripes as shown in FIG. 7A, a high-frequency component as shown in FIG. 7B can be extracted. However, for an image of horizontal stripes as shown in FIG. 8A, a high-frequency component cannot be extracted as shown in FIG. 8B. That is, AF cannot be implemented.

To solve this problem, a technique for extracting a high-frequency component in a vertical direction has been proposed. For example, a technique disclosed in Japanese Patent Application Publication No. 2005-326621 includes a 2nd order filter to extract high-frequency components in horizontal and vertical directions.

Figure 8C:
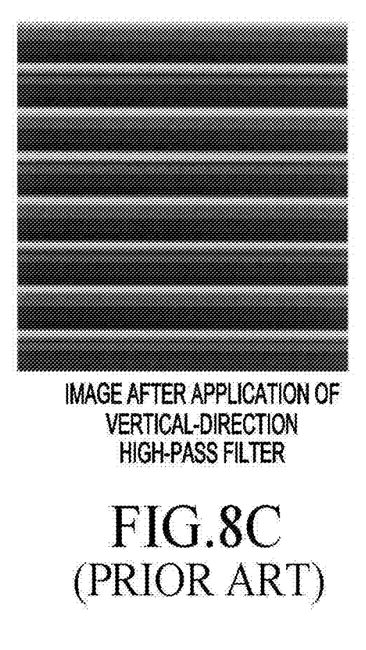
FIG. 8C is a diagram illustrating an image obtained when a vertical-direction HPF is applied to the image of the horizontal stripes shown in FIG. 8A.

A technique disclosed in Japanese Patent Publication No. 2007-94236 rotates an input image by 90° and applies a filter in a horizontal direction, thus obtaining the same effect as when the filter is applied in a vertical direction. In the technique disclosed therein, a vertical-direction 1st order filter is provided in addition to a horizontal-direction 1st order filter. Thus, by including the vertical-direction filter as well as the horizontal-direction filter, a high-frequency component can be extracted with respect to an image of horizontal stripes as shown in FIG. 8C, and the AF can be performed on a scene, such as a horizontal line, with high precision.

However, the conventional technique has some problems as will be discussed below. For example, a technique disclosed in Japanese Patent Publication No. 1997-107495 uses a 2nd order filter in which the increase of the number of taps adjusting a coefficient of the $2^{nd}$ filter for improving focusing precision results in the increase of a memory size.

The technique disclosed in Japanese Patent Application Publication No. 2005-326621 requires a memory region for storing a 90° rotated image and increases the memory cost.

Patent Document 3 does not disclose a detailed structure of an HPF. In particular, a method for implementing a vertical-direction HPF with low cost. As a result, to obtain steep cut-off characteristics with a generally used Finite Impulse Response (FIR)-type filter, the number of taps increases and thus the memory size also increases.

SUMMARY OF THE INVENTION

Accordingly, the present invention provides to an imaging apparatus capable of decreasing degradation in the AF function while also decreasing the amount of hardware resources consumed.

According to an aspect of the present invention, an imaging apparatus that adjusts focus based on frequency components extracted from an image signal is provided. The apparatus includes a 1st order Infinite Impulse Response (IIR)-filter including a plurality of sample delayers having a plurality of line buffers for buffering and delaying a plurality of samples to sequentially read pixels of the image signal through raster scanning and extracting frequency components of the image signal from the read pixels by using the plurality of sample delayers; and a delay sample number controller for controlling the IIR-filter to match the number of horizontal pixels sequentially read from the image signal through raster scanning to the number of the plurality of samples buffered by the plurality of line buffers, wherein the delay sample number controller commands the IIR-filter to read a sample from each of the plurality of line buffers in a direction perpendicular to a direction of the raster scanning, and perform filtering processing on the read sample.

According to another aspect of the present invention, an imaging method for an imaging apparatus that adjusts focus based on frequency components extracted from an image signal is provided. The method includes controlling, by a delay sample number controller, a Infinite Impulse Response (IIR)-filter to match a number of horizontal pixels sequentially read from the image signal through raster scanning to a number of the plurality of samples buffered by a plurality of line buffers; controlling, by the delay sample number controller, the IIR-filter to read a sample from each of the plurality of line buffers in a direction perpendicular to a direction of the raster scanning; and controlling, by the delay sample number controller, the IIR-filter to perform filtering processing with respect to the read sample, wherein the imaging apparatus comprises a 1st order IIR-filter including a plurality of sample delayers having the plurality of line buffers for buffering and delaying the plurality of samples to sequentially read pixels of the image signal through raster scanning, sequentially input the read sample to the plurality of sample delayers, and extracting frequency components of the image signal, and the delay sample number controller for controlling the IIR-filter.

BRIEF DESCRIPTION OF THE DRAWINGS

The above and other aspects, features and advantages of embodiments of the present invention will be more apparent from the following detailed description taken in conjunction with the accompanying drawings, in which.

DETAILED DESCRIPTION OF EMBODIMENTS OF THE PRESENT INVENTION

Hereinafter, an embodiment of the present invention will be described in detail with reference to the accompanying drawings. In the following description, specific details such as the detailed configuration and components are merely provided to assist with the overall understanding of the embodiment of the present invention. Therefore, it should be apparent to those skilled in the art that various changes and modifications of the embodiment described herein can be made without departing from the scope and spirit of the invention. The detailed descriptions of functions and configurations incorporated herein that are well known to those skilled in the art will be omitted to avoid unnecessarily obscuring the present invention.

Hereinafter, an imaging apparatus according to an embodiment of the present invention will be described with reference to the accompanying drawings.

Figure 1:
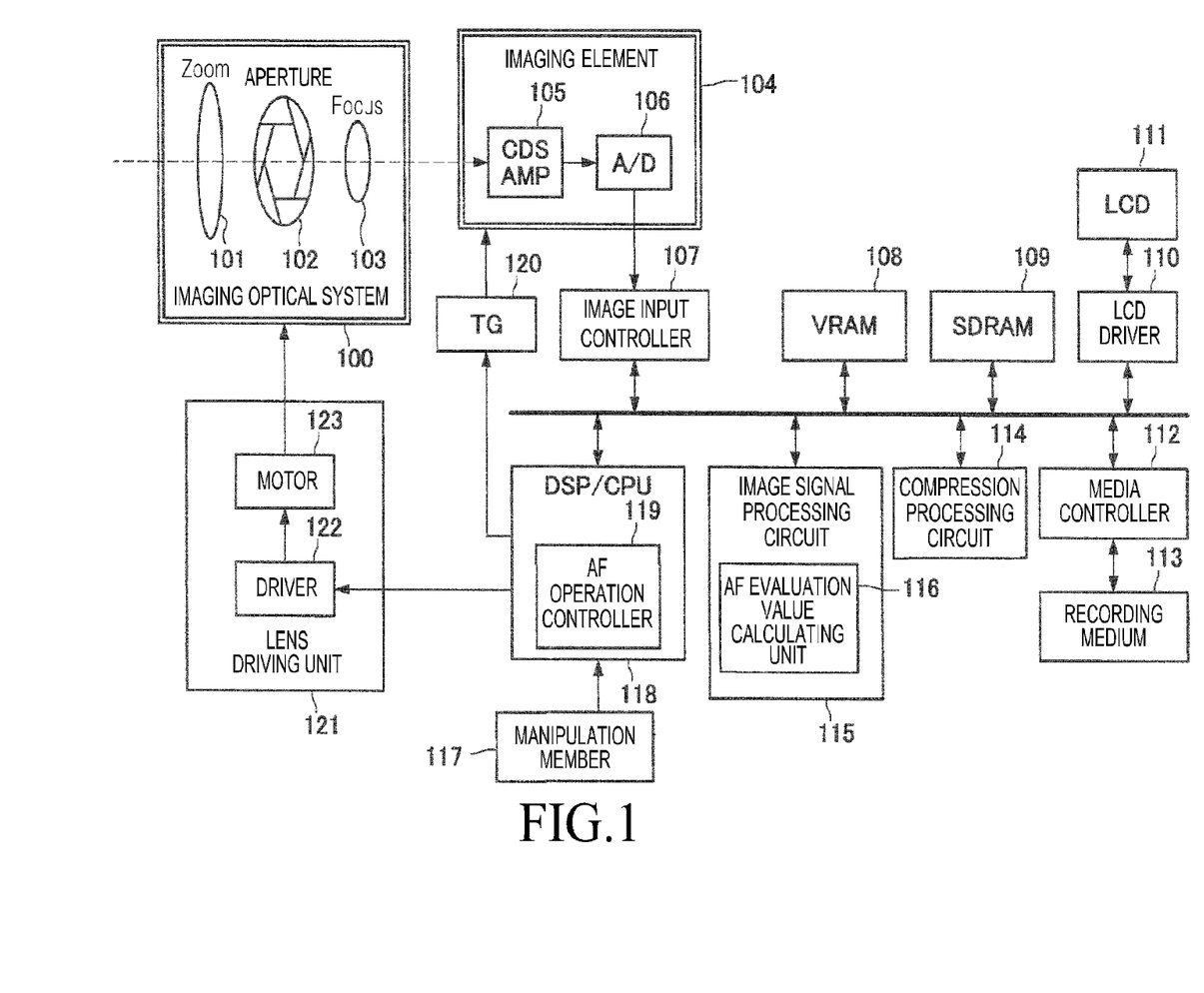
FIG. 1 is a block diagram illustrating an imaging apparatus according to an embodiment of the present invention.

FIG. 1 is a block diagram of an imaging apparatus 1000 according to an embodiment of the present invention. The imaging apparatus 1000 shown in FIG. 1 may be an example of an apparatus including a digital still camera, a camera-mounted cellular phone, a video camera capable of capturing still images, and the like, including an AF function.

The imaging apparatus 1000 shown in FIG. 1 may include an imaging optical system 100 (including a zoom lens 101, an aperture 102, and a focus lens 103), an imaging element 104 (including a Correlated Double Sampling (CDS)/AMPlifier (AMP) 105 and an Analog-to-Digital (A/D) converter 106), an image input controller 107, a Video Random Access Memory (VRAM) 108, a Synchronous Dynamic Random Access Memory (SDRAM) 109, a Liquid Crystal Display (LCD) driver 110, an LCD display 111, a media controller 112, a recording media 113, a compression processing circuit 114, an image signal processing circuit 115 (including an AF evaluation value-calculating unit 116), a manipulation member 117, a Digital Signal Processor (DSP)/Central Processing Unit (CPU) 118 (including an AF operation controller 119), a Timing Generator (TG) 120, a lens-driving unit 121, a driver 122, and a motor 123.

Light passes through the imaging optical system 100, including the zoom lens 101, the aperture 102, and the focus lens 103 to image the light on the imaging element 104. The zoom lens 101 changes the angle of view by changing a focal length. The aperture 102 adjusts the amount of passing light (light intensity). The focus lens 103 moves from a side-to-side to focus an object image on an imaging surface of the imaging element 104.

The imaging element 104 is a photoelectric conversion element including a plurality of elements, which can perform photoelectric conversion. In particular, optical information incident after passing through the imaging optical system 100 is converted into an electric signal. The imaging element 104 may be, for example, a Charge Coupled Device (CCD), a Complementary Metal-Oxide Semiconductor (CMOS), or the like.

To control an exposure time of the imaging element 104, a mechanical (manual) shutter (not shown) or an electronic shutter (not shown) may be used such that light is blocked during non-capturing and light reaches the imaging element 104 during capturing. Moreover, operations of the mechanical shutter and the electronic shutter are performed by a switch of a shutter button (e.g., the manipulation member 117) connected to the DSP/CPU 118. The imaging element 104 further includes the CDS/AMP unit 105 and the A/D converter 106.

The CDS/AMP unit 105 cancels low-frequency noise included in the electric signal converted from the optical information by the imaging element 104, and amplifies the electric signal to an arbitrary level.

The A/D converter 106 performs digital-conversion on the electric signal output from the CDS/AMP unit 105 to generate a digital signal. The A/D converter 106 outputs the generated digital signal to the image input controller 107.

The image input controller 107 processes the digital signal output from the A/D converter 106, generates an image signal which can be processed, and outputs the generated image signal to, for example, an image signal processing circuit 115. The image input controller 107 controls data read/write operations with respect to the SDRAM 109.

The VRAM 108 is a memory to display images and has a plurality of channels. The VRAM 108 may simultaneously perform input of image data for image display from the SDRAM 109 and output of image data to the LCD driver 110 for display on the LCD 111. A resolution or maximum number of expressed colors of the LCD 111 depends on the capacity of the VRAM 108.

The SDRAM 109 is an example of a storage unit, and temporarily stores image data of a captured image. The SDRAM 109 has a storage capacity capable of storing a plurality of image data, sequentially maintains an image signal in focus control, and outputs the image signal. The SDRAM 109 also stores an operating program of the DSP/CPU 118. The read operation of the image data from the SDRAM 109 and the write operation of the image data to the SDRAM 109 are controlled by the image input controller 107.

The LCD driver 110 is a display-driving unit, which receives image data from, for example, the VRAM 108, and displays an image on the LCD 111.

The LCD 111 is an example of a display unit provided on a body of the imaging apparatus 1000, and displays, for example, an image to be captured, which is read from the VRAM 108 (live view image), various setting screens, an image captured and recorded. In the current embodiment, the LCD 111 functions as a display unit and the LCD driver 110 functions as a display-driving unit of the LCD 111, but the present invention is not limited to this example. For example, an organic Electroluminescence (EL) display may function as a display unit and an organic EL display-driving unit may function as a display-driving unit.

The media controller 112 controls the write operation of the image data to the recording medium 113 or the read operation of image data or setting information recorded on the recording medium 113.

The recording medium 113 is, for example, an optical disc (a Compact Disc (CD), a Digital Versatile Disc (DVD), a Blue-ray disc, or the like), a magneto-optical disk, a magnetic disk, a semiconductor recording medium, or the like, and records captured image data. Herein, the media controller 112 and the recording medium 113 may be separate from the imaging apparatus 1000.

The compression processing circuit 114 receives an image signal, which has not yet been compressed, and compresses the image signal into a compression format, for example, a Joint Photographic Experts Group (JPEG) format. The compression processing circuit 114 outputs the image data generated by compression processing to, for example, the media controller 112.

The image signal processing circuit 115 receives the image signal from the image input controller 107, performs various image processing with respect to the image signal based on a white balance control value, an edge emphasis control value, and the like, and generates an image-processed image signal. The image signal processing circuit 115, according to the current embodiment of the present invention, includes the AF evaluation value-calculating unit 116 which calculates an AF evaluation value based on the image signal and outputs the calculated AF evaluation value to the DSP/CPU 118. The AF evaluation value-calculating unit 116 will be described later.

The manipulation member 117 may be, for example, an up/down/left/right key, a power switch, a mode dial, a shutter button or the like, provided in the imaging apparatus 1000, and outputs a manipulation signal to the DSP/CPU 118 based on the user's manipulation. For example, the shutter button may be half-pressed, fully-pressed, or released by the user. The shutter button outputs a manipulation signal for initiating focus control when half-pressed, and outputs a manipulation signal for ending focus control when released from the half-pressed state. The shutter button, when fully-pressed, outputs a manipulation signal for initiating capturing.

The DSP/CPU 118 functions as an operation processing apparatus and a control apparatus based on a program, and controls processing of each component included in the imaging apparatus 1000. The DSP/CPU 118 controls the imaging optical system 100 by outputting a signal to the driver 122 based on, for example, focus control or exposure control. The DSP/CPU 118 also controls each component of the imaging apparatus 1000 based on a manipulation signal from the manipulation member 117. Moreover, although the DSP/CPU 118 is implemented as a single component in the current embodiment, it may also be implemented with a plurality of CPUs such that separate CPUs process a command of a signal system and a command of a manipulation system. The DSP/CPU 118 of the current embodiment has the AF operation controller 119 therein, as shown in FIG. 1.

The AF operation controller 119, upon receiving a manipulation signal for initiating focus control, generates a control signal for moving the focus lens 103 in a certain direction, and outputs the generated control signal to the driver 122. The AF operation controller 119 is an example of a contrast value calculator and a focusing position detector, and calculates a focusing position of the focus lens 103 based on the AF evaluation value calculated by the AF evaluation value calculator 116 included in the image signal processing circuit 115, and outputs the focusing position as a control signal to the driver 122.

The AF evaluation value is, for example, a contrast value of an image, and when the contrast value has a peak value, an object image is focused on the imaging surface of the imaging element 104 (the contrast detection scheme). The AF operation controller 119 is also an example of a main object image determiner, and determines at least one main object images based on a distance to the object image.

The TG 120 outputs a timing signal to the imaging element 104 or the CDS/AMP unit 105 and controls the exposure time of pixels of the imaging element 104 or a read operation of electric charges.

The lens-driving unit 121 includes the driver 122 and the motor 123, such that the driver 122 generates a driving signal based on the control signal received from the DSP/CPU 118 and outputs the generated driving signal to the motor 123 to drive the motor 123. The motor 123 then controls the zoom lens 101, the aperture 102, and the focus lens 103.

Additionally, a series of processing in the imaging apparatus 1000 may be performed with hardware or software based on a program.

The AF evaluation value calculator 116, according to an embodiment of the present invention, will be described in detail with reference to FIGS. 2 to 4 below.

The AF, using the contrast detection scheme, calculates an AF evaluation value while moving the focus lens, as described above, and detects the position at which the AF evaluation value has a peak value as a focusing position of an object. The AF evaluation value is calculated based on a high-frequency component of an image and for detection of the high-frequency component, an HPF is used.

Figure 2:
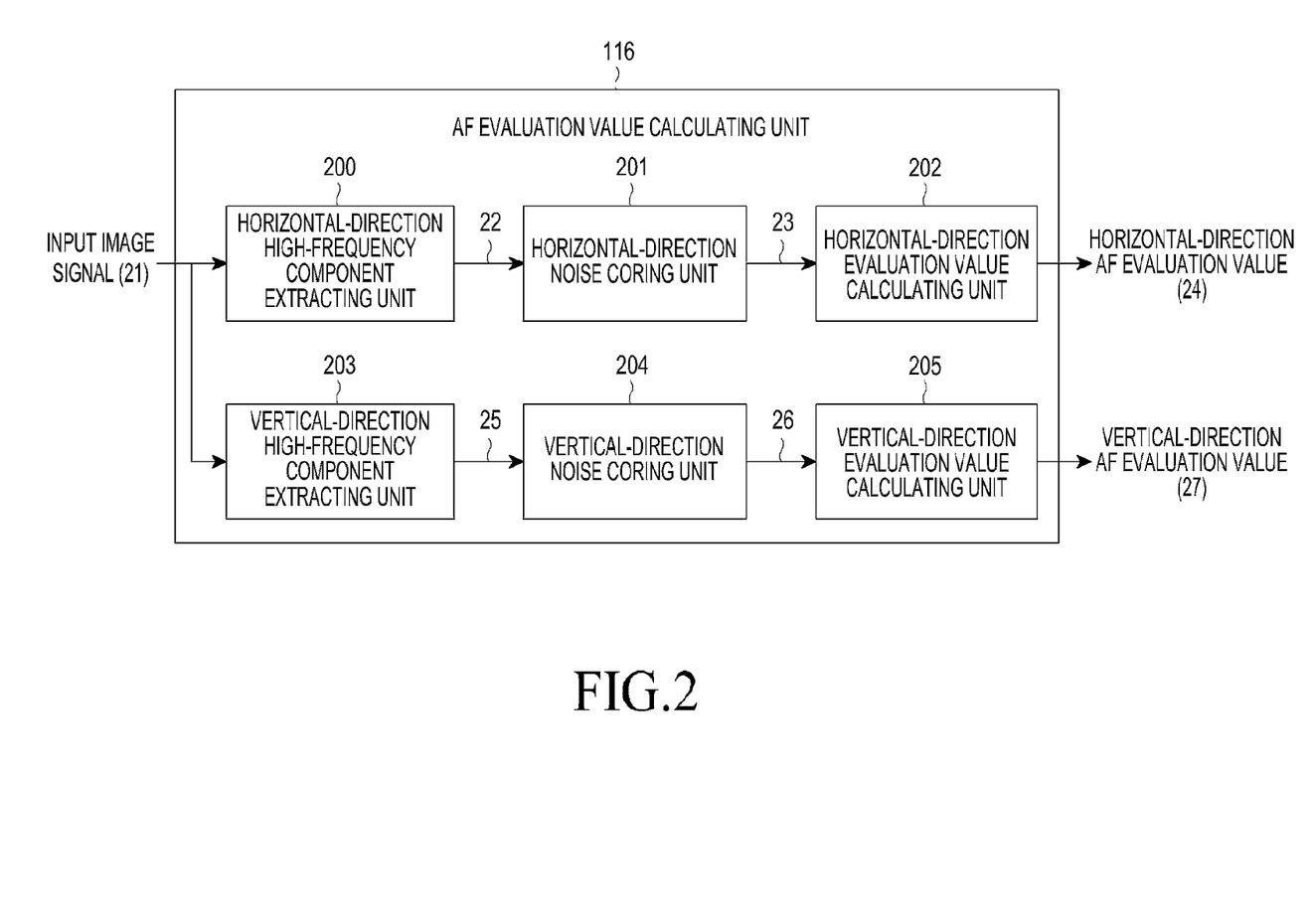
FIG. 2 is a block diagram illustrating an AF evaluation value-calculating unit according to an embodiment of the present invention.

FIG. 2 is a block diagram of the AF evaluation value calculator 116 according to an embodiment of the present invention. FIGS. 3 and 4 are block diagrams of a horizontal-direction high-frequency component-extracting unit 200 and a vertical-direction high-frequency component-extracting unit 203, respectively. Certain regions of an image are set to an AF evaluation region (a range where an AF evaluation value is calculated) and an image signal in the AF evaluation region is used as an input image signal 21 of the AF evaluation value calculator 116.

The AF evaluation value calculator 116 shown in FIG. 2 may include the horizontal-direction high-frequency component-extracting unit 200, a horizontal-direction noise-coring unit 201, a horizontal-direction evaluation value-calculating unit 202, the vertical-direction high-frequency component-extracting unit 203, a vertical-direction noise-coring unit 204, and a vertical-direction evaluation value calculating unit 205. The AF evaluation value calculator 116 applies an HPF to the input image signal 21 in horizontal and vertical directions to output a horizontal-direction AF evaluation value 24 and a vertical-direction AF evaluation value 27.

A method for calculating the horizontal-direction AF evaluation value 24 according to an embodiment of the present invention will be described below.

Hereinafter, in the current embodiment, a $2^{nd}$ order Infinite Impulse Response (IIR)-filter is used as the HPF. For example, an IIR-filter of order other than 2 may also be used.

The horizontal-direction high-frequency component-extracting unit 200 applies a horizontal-direction 1st order IIR-filter to the input image to extract a horizontal-direction high-frequency component. The horizontal-direction high-frequency component-extracting unit 200, as shown in FIG. 3, includes four adders 300 through 303, five multipliers 304 through 308, and sample delayers 309 and 310, also indicated by HD1 and HD2, respectively. The horizontal-direction high-frequency component-extracting unit 200 receives horizontal pixels one-by-one and sequentially applies a horizontal-direction 1st order IIR-filter to output a horizontal high-frequency component 22. For example, assuming fed forward coefficients 33 and 34 be a1 and a2, respectively, and feedback coefficients 35, 36 and 37 be b0, b1, and b2, respectively, then an IIR-filter's transfer function H(z) used in the horizontal-direction high-frequency component-extracting unit 200 shown in FIG. 3 can be expressed as Equation (1) below.

$$H(z) = \frac{b_0 + b_1 z^{-1} + b_2 z^{-2}}{1 - a_1 z^{-1} - a_2 z^{-2}} \quad (1)$$

An IIR-filter is used as an HPF. The IIR can obtain blocking characteristics with a lower order than Finite Impulse Response (FIR). However, if the IIR-filter is used, a coefficient of the IIR-filter must be designed to operate the IIR-filter in a stable manner.

The horizontal-direction noise-coring unit 201 of FIG. 2 takes an absolute value of the horizontal high-frequency component 22 to which the IIR-filter has been applied, and compares the absolute value of the horizontal high-frequency component 22 with a predetermined threshold value, and rounds off the value of the horizontal high-frequency component 22 to 0. Through the coring process, noise is prevented from affecting an evaluation value, thereby improving the stability of AF. The horizontal-direction evaluation value-calculating unit 202 accumulatively adds a horizontal high-frequency component 23, which has been coring-processed, to multiply all values in the AF evaluation region and then outputs a result of multiplication as the horizontal-direction AF evaluation value 24.

Next, a method of calculating the vertical-direction AF evaluation value 27 according to an embodiment of the present invention will be described.

The vertical-direction high-frequency component-extracting unit 203 applies a vertical-direction 1st order IIR-filter to an input image and extracts a vertical-direction high-frequency component. The vertical-direction high-frequency component-extracting unit 203, as shown in FIG. 4, includes four adders 400 through 403, five multipliers 404 through 408, a plurality of sample delayers 409 and 410, a horizontal pixel-thinning unit 411, a sample number setting unit 412, and a delay sample number controller 413.

The plurality of sample delayers 409 and 410 delays a plurality of samples. Herein, the plurality of sample delayers 409 and 410 include line buffers. The plurality of sample delayers 409 and 410 include the line buffers that buffer and delay a plurality of samples, respectively. The IIR-filter sequentially reads pixels forming an image signal through raster scanning, and extracts frequency components of the image signal from the read pixels by using the plurality of sample delayers 409 and 410.

The horizontal pixel-thinning unit 411 performs thinning processing with regard to some of a plurality of pixels forming the image signal in a horizontal direction. More specifically, the horizontal pixel-thinning unit 411 performs thinning processing with respect to an input pixel in the horizontal direction when the number of horizontal pixels of the AF evaluation region exceeds a size of the line buffer.

The sample number setting unit 412 sets a sample number N of the plurality of sample delays 409 and 410 (the number of the plurality of samples buffered by the plurality of line buffers of the plurality of sample delayers 409 and 410). Herein, the sample number setting unit 412 sets the sample number N to be equal to the number of horizontal pixels of the image signal to be filtered.

The delay sample number controller 413 controls the plurality of sample delayers 409 and 410 to delay samples of the sample number N set by the sample number setting unit 412. That is, the delay sample number controller 413 controls the plurality of sample delayers 409 and 410 to buffer the plurality of samples corresponding to the sample number N set by the sample number setting unit 412 and delay them.

The delay sample number controller 413 controls samples read from the plurality of sample delayers 409 and 410 to perform filtering in a direction orthogonal to an image scanning direction. The delay sample number controller 413 controls the IIR-filter to match the number of horizontal pixels which are sequentially read from the image signal through raster scanning to the number of a plurality of samples buffered by the plurality of line buffers, respectively.

Figure 3:
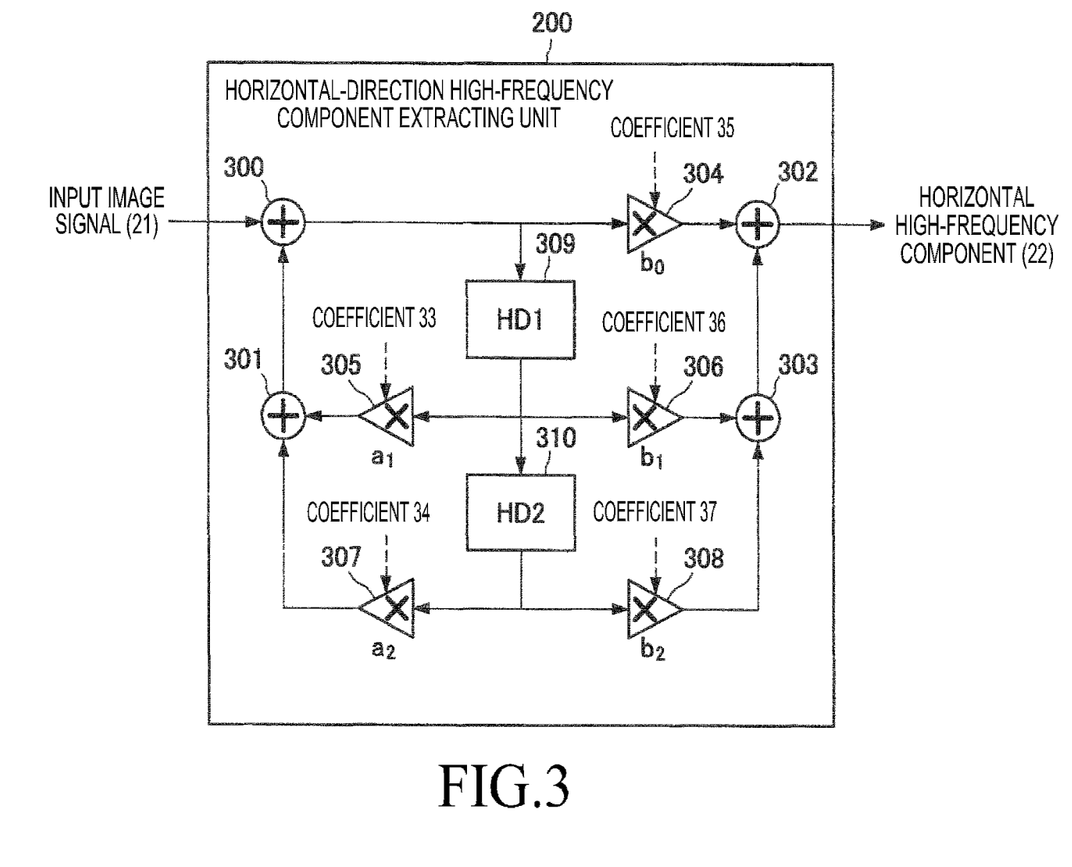
FIG. 3 is a block diagram illustrating a horizontal-direction high-frequency component-extracting unit according to an embodiment of the present invention.

In this way, the image signal is read pixel-by-pixel in a raster scanning order, and the IIR-filter may also be sequentially applied to the image signal in the vertical direction like in the horizontal IIR-filter used by the horizontal-direction high-frequency component-extracting unit 200 shown in FIG. 3. That is, if feedforward coefficients 43 and 44 are a1 and a2 and feedback coefficients 45 through 47 are b0, b1, and b2, a transfer function H(z) of the vertical-direction IIR-filter used by the vertical-direction high-frequency component-extracting unit 203 shown in FIG. 4 may be expressed the same as Equation 1.

A method for calculating the vertical-direction AF evaluation value by applying the vertical-direction 1st order IIR-filter will be described in detail with reference to FIGS. 2, 4, and 5 below. FIG. 5 is a flowchart of vertical-direction AF evaluation value calculation according to an embodiment of the present invention.

It is assumed that the AF evaluation region is in a rectangular shape having a width W and a height H (W>1 and H>1). A pixel having coordinates (x, y) in the AF evaluation region is expressed as p (x, y), the left top coordinates are (1, 1), and the right bottom coordinates are (W, H).

The vertical-direction high-frequency component-extracting unit 203 obtains the input image signal 21 in step S100. In step S101, the vertical-direction high-frequency component-extracting unit 203 then initializes an AF evaluation value E to 0, and initializes the coordinates (x, y) to the left top coordinates (1, 1) of the AF evaluation region.

Figure 4:
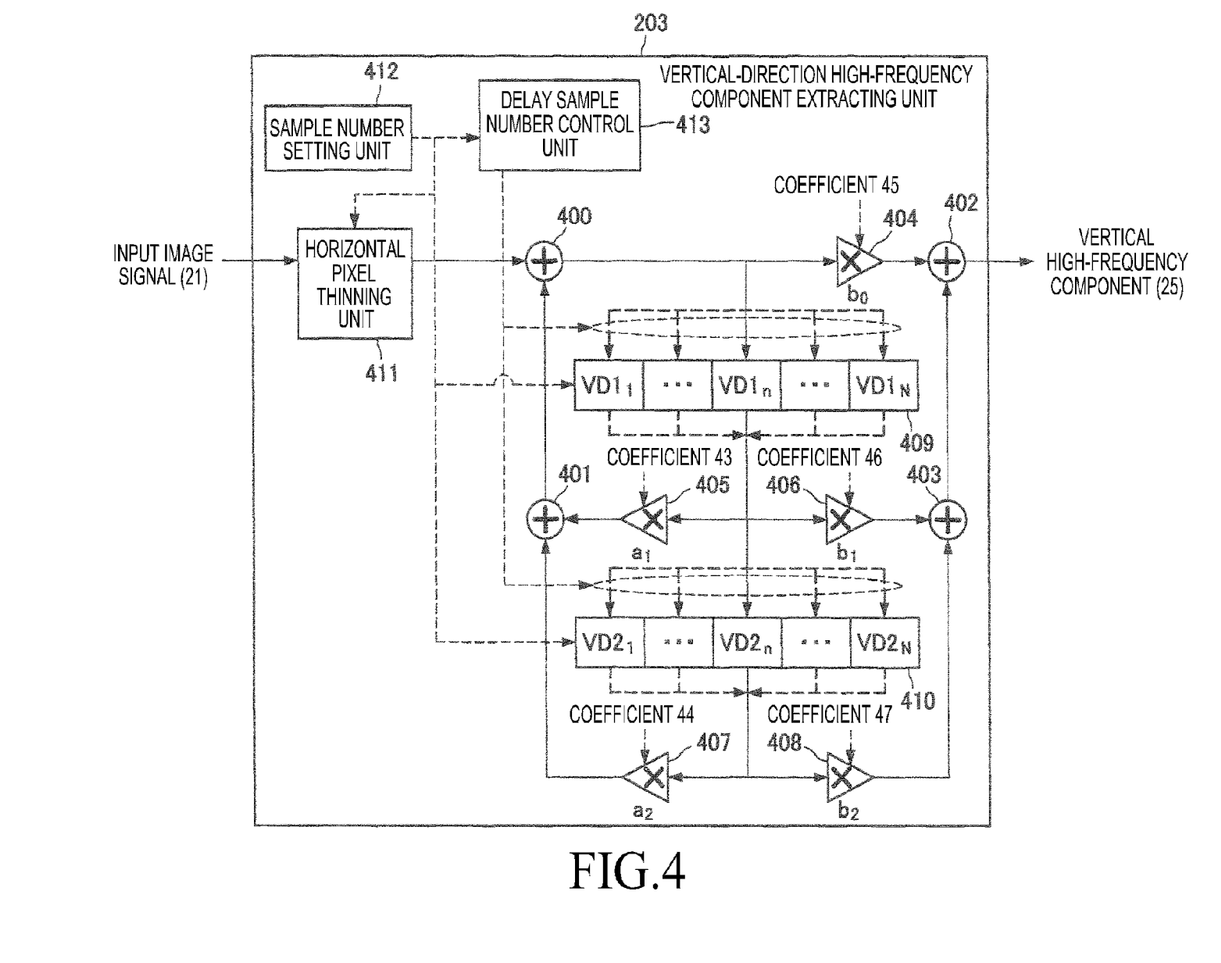
FIG. 4 is a block diagram illustrating a circuit configuration of a vertical-direction high-frequency component-extracting unit according to an embodiment of the present invention.
Figure 5:
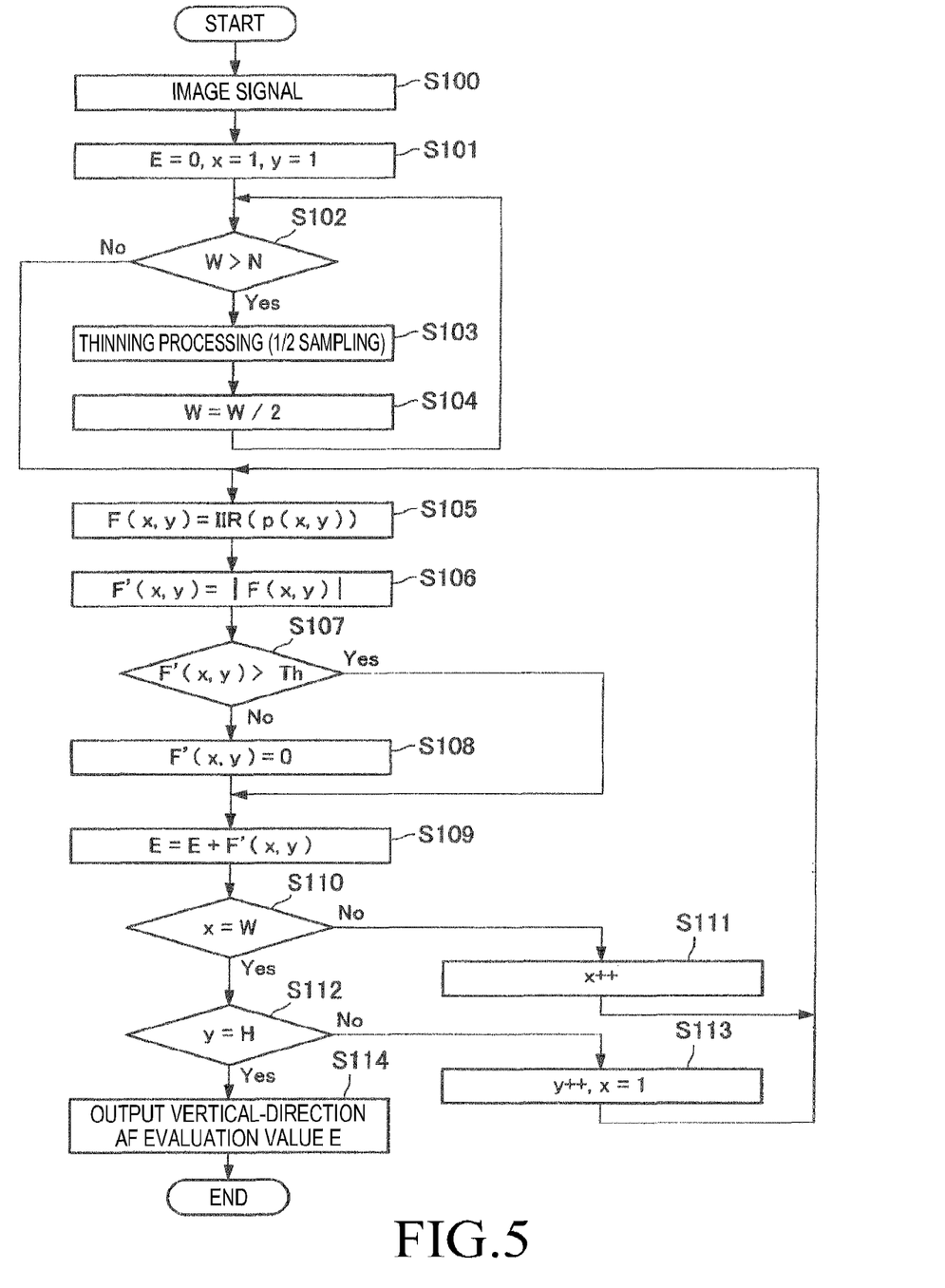
FIG. 5 is a flowchart illustrating a vertical-direction AF evaluation value calculation according to an embodiment of the present invention.

In step S102, the horizontal pixel-thinning unit 411 shown in FIG. 4 compares the width W of the AF evaluation region with the sample number N set by the sample number setting unit 412. Herein, if W is greater than N, the horizontal pixel-thinning unit 411 half-samples pixels in the horizontal direction in step S103 and updates the width W with a result of dividing the width W by 2 in step S104. The horizontal pixel-thinning unit 411 repeats steps S102 through S104 until W≦N.

In step S102, if W≦N, the sample number setting unit 412 sets W to the sample number N and the vertical-direction high-frequency component-extracting unit 203 reads horizontal pixels of the AF evaluation region one-by-one to perform the following steps. Depths of line buffers VD11 to VD1N and VD21 to VD2N of the plurality of sample delayers 409 and 410 are determined based on the sample number N set by the sample number setting unit 412.

The vertical-direction high-frequency component-extracting unit 203 applies the IIR-filter having the circuit configuration shown in FIG. 4 to the p (x, y) to generate a pixel F (x, y) which has been filtering-processed in step S105. In the IIR-filter circuit used by the vertical-direction high-frequency component-extracting unit 203 shown in FIG. 4, two line buffers serve as the plurality of sample delayers 409 and 410 and the delay sample number controller 413 controls the line buffers 409 and 410 to refer to samples located vertically to pixels to be filtered, thereby applying the vertical-direction 1st order IIR-filter.

In the vertical-direction noise-coring unit 204 shown in FIG. 2, the following steps S106 to S108 are performed.

The vertical-direction noise-coring unit 204 takes an absolute value of the pixel F (x, y) which has been filtering-processed, thus obtaining F' (x, y) in step S106.

The vertical-direction noise-coring unit 204 compares F'(x, y) with a predetermined threshold value Th in step S107, such that if F' (x, y) is less than Th (or F' (x, y) is smaller than Th), F' (x, y) is equal to 0 in step S108. Thus, the noise does not affect the evaluation value, thereby improving the stability of the AF.

The vertical-direction evaluation value calculating unit 205 shown in FIG. 2 accumulatively adds F'(x, y) to the AF evaluation value E in step S109. In the current embodiment, the vertical-direction evaluation value calculating unit 205 uses a product of high-frequency components as the AF evaluation value E, but a peak value of the high-frequency components may also be used.

The vertical-direction high-frequency component-extracting unit 203 sequentially processes steps S105 through S113 while raster-scanning the AF evaluation region from the left top pixel to the right bottom pixel, thereby calculating the vertical-direction AF evaluation value E over the entire AF evaluation region.

In step S114, the vertical-direction evaluation value calculating unit 205 outputs the calculated vertical-direction AF evaluation value E as the vertical-direction AF evaluation value 27.

Thus, AF evaluation value calculation using the vertical-direction 1st order IIR-filter according to an embodiment of the present invention has been described.

According to an embodiment of the present invention, the AF evaluation value can be calculated by applying the IIR-filter in the vertical direction with limited hard resources, and AF can be achieved with high-focusing precision while suppressing cost increase.

In other words, the imaging apparatus according to the present invention can decrease degradation of the AF function while decreasing the amount of hardware resources used.

While the present invention has been shown and described with reference to certain embodiments and drawings of the portable terminal, it will be understood by those skilled in the art that various changes in form and details may be made therein without departing from the spirit and scope of the invention as defined by the appended claims and their equivalents.

What is claimed is:

1. An imaging apparatus that adjusts focus based on frequency components extracted from an image signal, the apparatus comprising:
    a 1st order Infinite Impulse Response (IIR)-filter including a plurality of sample delayers having a plurality of line buffers for buffering and delaying a plurality of samples to sequentially read pixels of the image signal through raster scanning and extracting frequency components of the image signal from the read pixels by using the plurality of sample delayers; and
    a delay sample number controller for controlling the IIR-filter to match the number of horizontal pixels sequentially read from the image signal through raster scanning to the number of the plurality of samples buffered by the plurality of line buffers,
    wherein the delay sample number controller commands the IIR-filter to read a sample from each of the plurality of line buffers in a direction perpendicular to a direction of the raster scanning, and perform filtering processing on the read sample.

2. The imaging apparatus of claim 1, further comprising:
    a sample number setting unit for setting the number of the plurality of samples buffered by the plurality of line buffers,
    wherein the delay sample number controller commands the plurality of sample delayers to buffer and delay a plurality of samples corresponding to the sample number set by the sample number setting unit.

3. The imaging apparatus of claim 1, further comprising:
    a horizontal pixel-thinning unit for performing thinning processing with respect to a plurality of pixels of the image signal in a horizontal direction.

4. An imaging method for an imaging apparatus that adjusts focus based on frequency components extracted from an image signal, the method comprising:
    controlling, by a delay sample number controller, a Infinite Impulse Response (IIR)-filter to match a number of horizontal pixels sequentially read from the image signal through raster scanning to a number of the plurality of samples buffered by a plurality of line buffers;
    controlling, by the delay sample number controller, the IIR-filter to read a sample from each of the plurality of line buffers in a direction perpendicular to a direction of the raster scanning; and
    controlling, by the delay sample number controller, the IIR-filter to perform filtering processing with respect to the read sample,
    wherein the imaging apparatus comprises a 1st order IIR-filter including a plurality of sample delayers having the plurality of line buffers for buffering and delaying the plurality of samples to sequentially read pixels of the image signal through raster scanning, sequentially input the read sample to the plurality of sample delayers, and extracting frequency components of the image signal, and the delay sample number controller for controlling the IIR-filter.

* * * * *

UNITED STATES PATENT AND TRADEMARK OFFICE
CERTIFICATE OF CORRECTION

| | | |
|---|---|---|
| PATENT NO. | : 8,520,133 B2 | Page 1 of 1 |
| APPLICATION NO. | : 13/331477 | |
| DATED | : August 27, 2013 | |
| INVENTOR(S) | : Naofumi Wada | |

It is certified that error appears in the above-identified patent and that said Letters Patent is hereby corrected as shown below:

On the title page,
Item (30) Foreign Application Priority Data:

"Dec. 21, 2010   (JP) ..................... 2010-284947"

should be

--Dec. 21, 2010   (JP) ..................... 2010-284947
  Nov. 18, 2011   (KR) ................... 10-2011-0121076--.

Signed and Sealed this
Fourth Day of February, 2014

Michelle K. Lee
*Deputy Director of the United States Patent and Trademark Office*